(12) United States Patent
Byun

(10) Patent No.: US 10,901,659 B2
(45) Date of Patent: Jan. 26, 2021

(54) MEMORY SYSTEM FOR PROGRAMMING USER DATA WHOSE SIZE IS DIFFERENT FROM THE REFERENCE SIZE AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/406,233

(22) Filed: May 8, 2019

(65) Prior Publication Data
US 2020/0104073 A1 Apr. 2, 2020

(30) Foreign Application Priority Data
Sep. 28, 2018 (KR) .......................... 10-2018-0116239

(51) Int. Cl.
*G06F 3/06* (2006.01)
*G06F 12/12* (2016.01)

(52) U.S. Cl.
CPC ............ *G06F 3/0659* (2013.01); *G06F 3/064* (2013.01); *G06F 3/0608* (2013.01); *G06F 3/0673* (2013.01); *G06F 12/12* (2013.01); *G06F 2212/1044* (2013.01)

(58) Field of Classification Search
CPC ...... G06F 3/0659; G06F 3/0608; G06F 3/064; G06F 3/0673; G06F 12/12; G06F 2212/1044
See application file for complete search history.

(56) References Cited

U.S. PATENT DOCUMENTS 9,245,630 B2* 1/2016 Kwak ................. G11C 11/5628
9,424,183 B2* 8/2016 Kim ..................... G06F 12/0246
9,672,149 B2* 6/2017 Park ........................ G11C 16/12

FOREIGN PATENT DOCUMENTS

KR 10-2015-0095260 8/2015
KR 10-2016-0073873 6/2016

* cited by examiner

*Primary Examiner* — Tracy A Warren
(74) *Attorney, Agent, or Firm* — IP & T Group LLP

(57) ABSTRACT

A memory system includes a memory device including a plurality of normal memory blocks and a plurality of dummy memory blocks; and a controller suitable for controlling the memory device, wherein the controller includes: a memory suitable for temporarily storing user data corresponding to a write command; and a processor suitable for performing a one-shot program operation of programming the user data into an open memory block in the memory device by comparing a size of the user data with a reference size for the one-shot program operation.

18 Claims, 15 Drawing Sheets

MEMORY SYSTEM FOR PROGRAMMING USER DATA WHOSE SIZE IS DIFFERENT FROM THE REFERENCE SIZE AND OPERATING METHOD THEREOF

CROSS-REFERENCE TO RELATED APPLICATIONS

The present application claims priority under 35 U.S.C. § 119(a) to Korean Patent Application No. 10-2018-0116239 filed on Sep. 28, 2018, the disclosure of which is incorporated herein by reference in its entirety.

BACKGROUND

1. Field

Various exemplary embodiments of the present invention generally relate to a memory system. Particularly, the exemplary embodiments relate to a memory system capable of efficiently processing dummy data, and an operating method thereof.

2. Description of the Related Art

The computer environment paradigm has shifted towards ubiquitous computing, which enables computing systems to be used anytime and anywhere. As a result, the demand for portable electronic devices, such as mobile phones, digital cameras, and laptop computers have rapidly increased. Those electronic devices generally include a memory system using a memory device such as a data storage device. The data storage device may be used as a main memory unit or an auxiliary memory unit of a portable electronic device.

Since there is no mechanical driving part, using a data storage device provides advantages such as excellent stability and durability, high information access speed, and low power consumption. Also, the data storage device can have a higher data access rate and lower power consumption than a hard disk device. Non-limiting examples of the data storage device having such advantages include Universal Serial Bus (USB) memory devices, memory cards of diverse interfaces, Solid-State Drives (SSD) and the like.

SUMMARY

Various embodiments of the present invention are directed to a memory system capable of efficiently processing dummy data.

In accordance with an embodiment of the present invention, a memory system may include: a memory device including a plurality of normal memory blocks and a plurality of dummy memory blocks; and a controller suitable for controlling the memory device, wherein the controller includes: a memory suitable for temporarily storing user data corresponding to a write command; and a processor suitable for performing a one-shot program operation of programming the user data into an open memory block in the memory device by comparing a size of the user data with a reference size of the one-shot program operation.

In accordance with an embodiment of the present invention, an operating method of a memory system may include: storing user data corresponding to a write command; comparing a size of the user data with a reference size of a one-shot program operation; and performing the one-shot program operation of programming the user data into an open memory block based on the comparison result.

In accordance with an embodiment of the present invention, a memory system may include: a memory device including a dummy memory block; a controller configured to control the memory device to program user data together with dummy data into one or more pages within the dummy memory block when a size of the user data is different from a reference size, wherein the size of the dummy data is a difference between the size of the user data and the reference size, and wherein the reference size is a multiple of a size of a single page within the dummy memory block.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
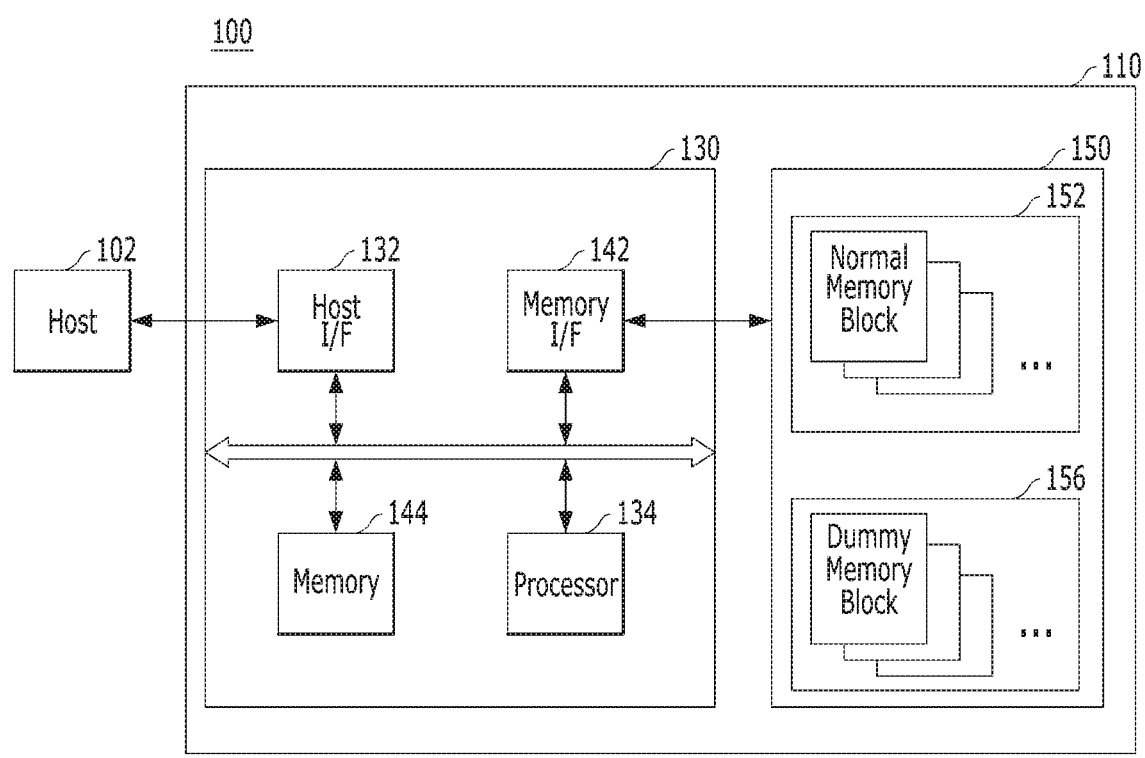
FIG. 1 is a block diagram illustrating a data processing system including a memory system in accordance with an embodiment of the present disclosure.

Various examples of the disclosure are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. Throughout the disclosure, like reference numerals refer to like parts throughout the various figures and examples of the disclosure. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art, and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a television (TV), a projector and the like.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled to the host 102, according to a protocol of a host interface. Non-limiting examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as, for example, a dynamic random access memory (DRAM) and a static RAM (SRAM) and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102, and the controller 130 may control storage of data in the memory device 150.

The controller 130 and the memory device 150 may be integrated into a single semiconductor device, which may be included in the various types of memory systems as exemplified above.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even when electrical power is not supplied. The memory device 150 may store data provided from the host 102 through a write operation, and provide data stored therein to the host 102 through a read operation. The memory device 150 may include a plurality of memory blocks, each of the memory blocks may include a plurality of pages. Each of the plurality of pages may include a plurality of memory cells to which a plurality of word lines (WL) are electrically coupled.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102, and/or may store the data, provided by the host 102, into the memory device 150.

The controller 130 may include a host interface (I/F) 132, a processor 134, a memory interface (I/F) 142 and a memory 144 all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (DATA), small computer system interface (SCSI), enhanced small disk interface (ESDI) and integrated drive electronics (IDE).

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134, in a case when the memory device 150 is a flash memory and, in particular, when the memory device 150 is a NAND flash memory.

The memory 144 may serve as a working memory for the memory system 110 and the controller 130, and may store temporary or transactional data for operating or driving the memory system 110 and the controller 130. The controller 130 may control the memory device 150 in response to a request from the host 102. The controller 130 may deliver data read from the memory device 150 into the host 102, may store data entered through the host 102 within the memory device 150. The memory 144 may be used to store data required for the controller 130 and the memory device 150 in order to perform these operations.

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the disclosure is not limited thereto. That is, the memory 144 may be located inside or outside the controller 130. For instance, the memory 144 may be embodied by an external volatile memory having a memory interface transferring data and/or signals transferred between the memory 144 and the controller 130.

The processor 134 may be implemented with a microprocessor or a central processing unit (CPU). The memory system 110 may include one or more processors 134.

The processor 134 may control entire operations of the memory system 110, and control a program or read operation on the memory device 150 in response to a write or read request of the host 102.

When the host 102 provides a write command along with user data to the controller 130, the processor 134 may determine a method for programming the user data, which is temporarily stored in the memory 144. For example, the processor 134 may determine whether to program the user data together with dummy data or program only the user data.

Specifically, the processor 134 may determine the method for programming the user data based on a reference size of the one-shot program operation. When the reference size of the one-shot program operation is different from the size of the user data, the processor 134 may control the memory device 150 to program the user data and the dummy data together into a dummy open memory block. In the present embodiment, the processor 134 may generate the dummy data having a predetermine size, and control the memory device 150 to program the user data together with the dummy data into the dummy open memory block. In some embodiments, the processor 134 may control the memory device 150 to generate the dummy data having the predetermined size and program the user data together with the generated dummy data in the dummy open memory block.

On the other hand, when the reference size of the one-shot program operation is equal to the size of the user data, the processor 134 may control the memory device 150 to program only the user data into a normal open memory block.

The method in which the processor 134 programs the user data is described below in further detail with reference to FIGS. 5A to 6B.

The processor 134 may determine whether or not the dummy data is programmed together with the user data, and then control the memory device 150 to program the user data together with the dummy data into one or more dummy open memory blocks among a plurality of dummy memory blocks 156. On the other hand, the processor 134 may control the memory device 150 to program the user data without dummy data into one or more normal open memory blocks among a plurality of normal memory blocks 152.

And, the controller 130 may further include an error correction code (ECC) component and a power management unit (PMU).

The ECC component may detect and correct errors in the data read from the memory device 150 during the read operation. When the number of the error bits is greater than or equal to a threshold number of correctable error bits, the ECC component may not correct error bits but may output an error correction fail signal indicating failure in correcting the error bits.

The ECC component may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component may include all or some of circuits, modules, systems or devices for performing the error correction operation based on at least one of the above described codes.

The PMU may provide and manage power of the controller 130.

Figure 2:
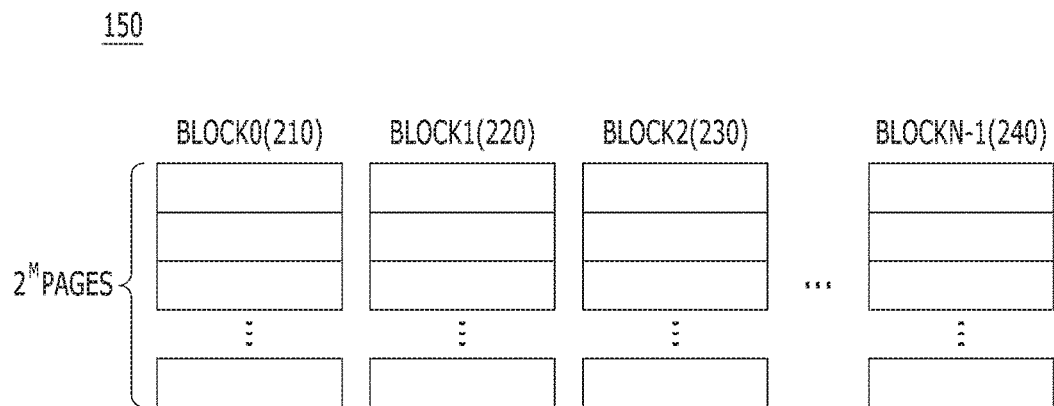
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include the plurality of memory blocks BLOCK0 to BLOCKN-1, and each of the blocks BLOCK0 to BLOCKN-1 may include a plurality of pages, for example, $2^M$ pages, the number of which may vary according to circuit design. The memory device 150 may include a plurality of memory blocks, such as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
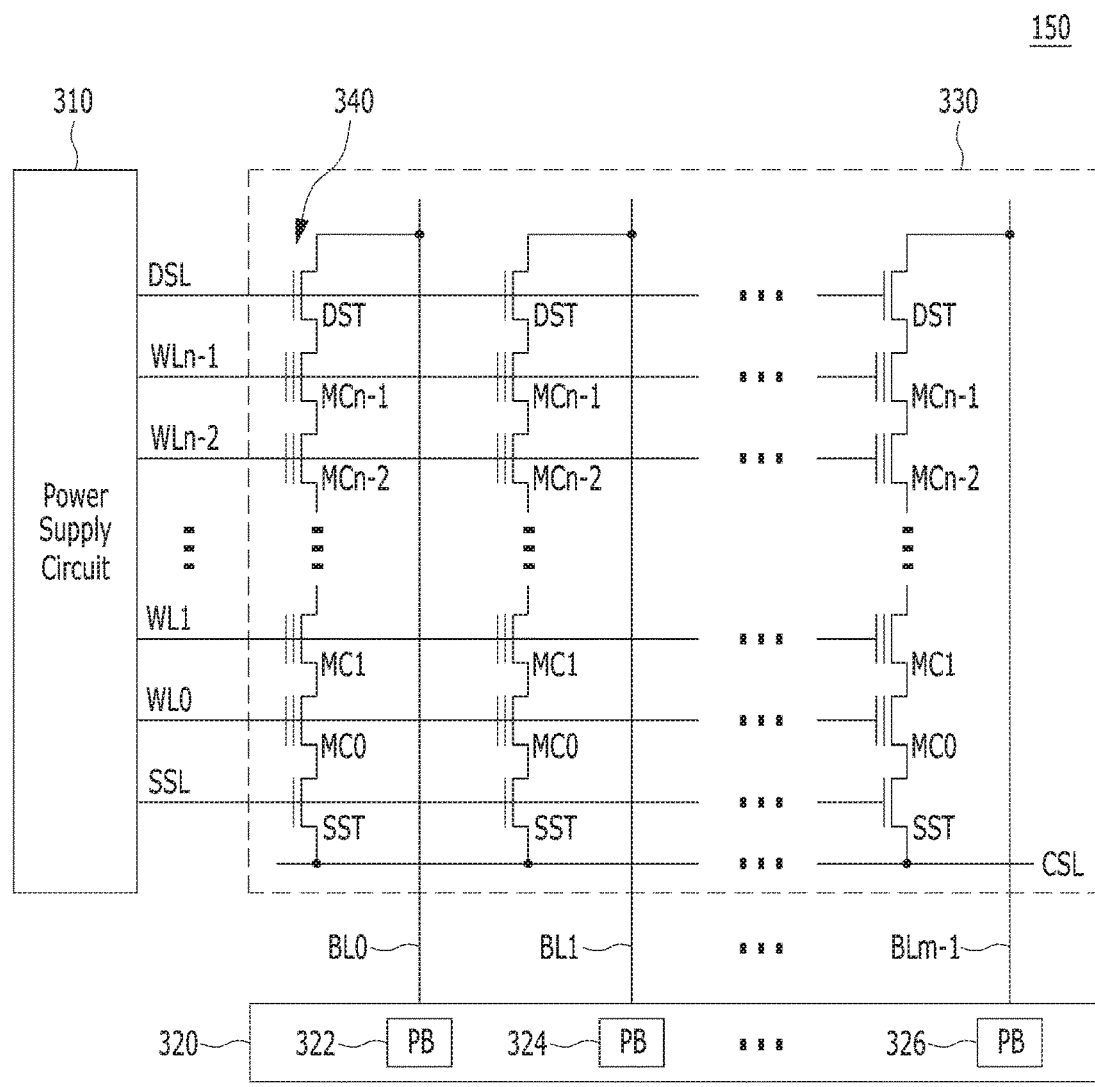
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 may correspond to any of the plurality of memory blocks included in the memory device 150 of the memory system 110.

Referring to FIG. 3, the memory block 330 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. However, the present invention is not limited to just the SLC or MLC. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, that the memory block 330 is constituted with NAND flash memory cells, it is to be noted that the memory block 330 of the memory device 150 according to the embodiment is not limited to a NAND flash memory. The memory block 330 may be realized by a NOR flash memory, a hybrid flash memory in which at least two types of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read and write (read/write) circuit 320 of the memory device 150 may be controlled by the control circuit, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
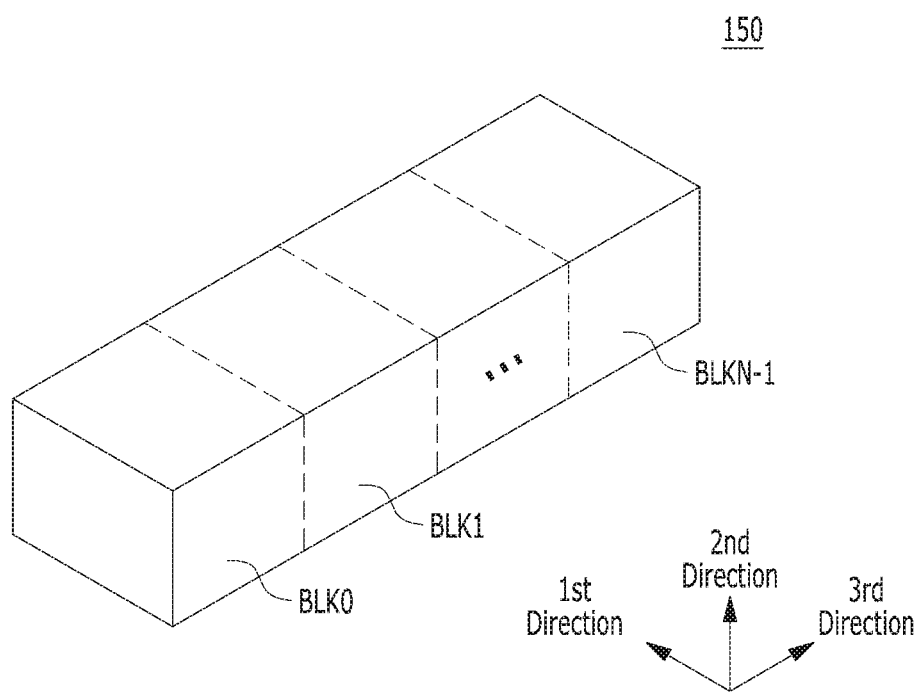
FIG. 4 is a schematic diagram illustrating an exemplary three-dimensional (3D) structure of the memory device shown in FIG. 2.

FIG. 4 is a schematic diagram illustrating a 3D structure of the memory device 150.

Although FIG. 4 shows a 3D structure, the memory device 150 may be embodied by a two-dimensional (2D) or three-dimensional (3D) memory device. Specifically, as illustrated in FIG. 3, the memory device 150 may be embodied in a nonvolatile memory device having a 3D stack structure. When the memory device 150 has a 3D structure, the memory device 150 may include a plurality of memory blocks BLK0 to BLKN-1 each having a 3D structure (or a vertical structure).

Figure 5A:
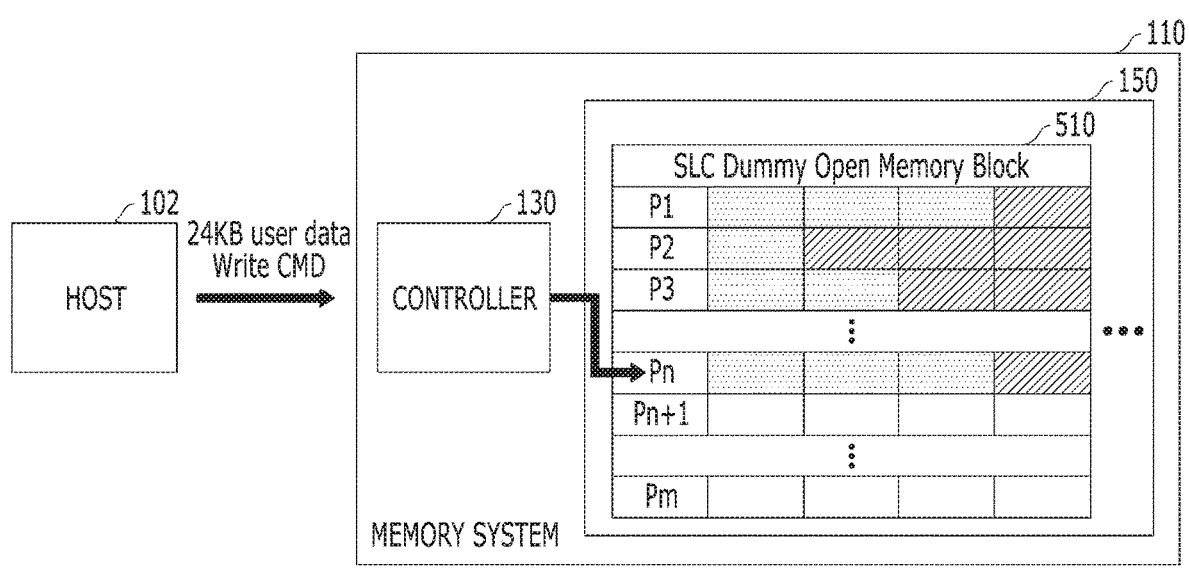
FIG. 5A is a block diagram schematically illustrating an operation of the memory system to program data into an SLC dummy open block in accordance with an embodiment of the present disclosure.

FIG. 5A is a block diagram schematically illustrating an operation of the memory system 110 to program data into a single level cell (SLC) dummy open block in accordance with an embodiment.

In FIG. 5A, a memory block is a single level cell memory block, and the one-shot program operation may be performed on a basis of one physical page of the SLC memory block. When the size of one physical page is 32 KB, the one-shot program operation may be performed for data having a size of multiples of 32 KB, such as 32 KB, 64 KB and 96 KB. That is, a reference size of data as a target of the one-shot program operation may be the multiples of 32 KB.

The host 102 may provide a write command to the memory system 110 in order to store user data of 24 KB.

The write command and the user data may be inputted to the controller 130 through the host interface unit 132, and the user data may be temporarily stored in the memory 144 shown in FIG. 1 under the control of the processor 134.

Subsequently, the processor 134 in FIG. 1 may select a SLC memory block in which the user data is to be stored based on the write command. Further, the processor 134 may compare the size of the user data with the reference size of the one-shot program operation. Since the size of the user data is 24 KB and the reference size of the one-shot program operation is 32 KB, that is, the size of the user data is different from the reference size of the one-shot program operation by an amount of 8 KB, the user data may be programmed into the memory block together with dummy data of 8 KB size. Accordingly, the processor 134 may control the memory device 150 to program the 24 KB user data (refer to shaded portions shown in the drawing) together with the 8 KB dummy data (refer to hatched portions shown in the drawing) into an $n^{th}$ physical page Pn of at least one SLC dummy open memory block 510 among the plurality of dummy memory blocks 156.

In the present embodiment, the processor 134 may generate the 8 KB dummy data, and provide the 24 KB user data and the 8 KB dummy data to the memory device 150 through the memory interface unit 142. Subsequently, the processor 134 may control the memory device 150 to program the 24 KB user data and the 8 KB dummy data into the $n^{th}$ physical page Pn. In some embodiments, the processor 134 may provide the 24 KB user data to the memory device 150 through the memory interface unit 142, and control the memory device 150 to generate the 8 KB dummy data. Subsequently, the processor 134 may control the memory device 150 to program the 8 KB dummy data and the 24 KB user data into the $n^{th}$ physical page Pn.

Figure 5B:
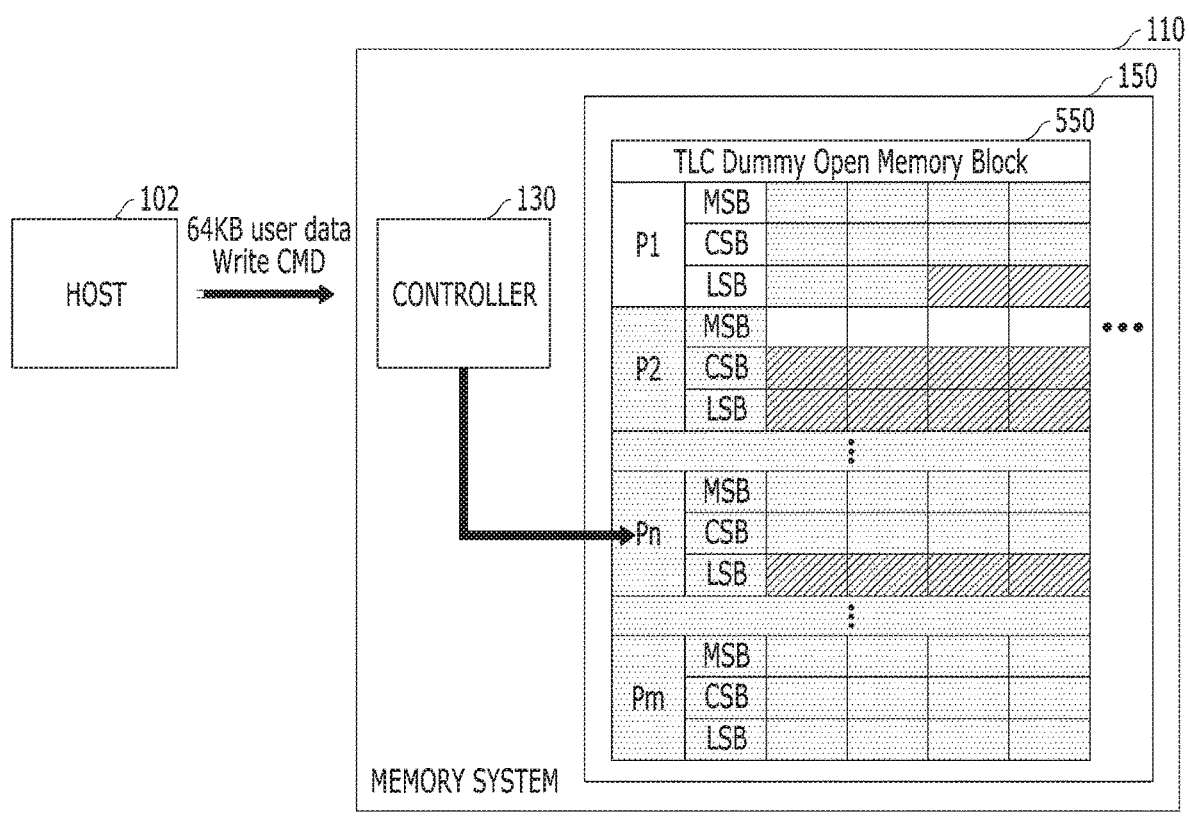
FIG. 5B is a block diagram schematically illustrating an operation of the memory system to program data into a TLC dummy open block in accordance with an embodiment of the present disclosure.

FIG. 5B is a block diagram schematically illustrating an operation of the memory system 110 to program data into a triple level cell (TLC) dummy open block in accordance with an embodiment.

In FIG. 5B, a memory block is a TLC memory block, and the one-shot program operation may be performed on a basis of one physical page of the TLC memory block. When the size of one page is 96 KB, the one-shot program operation may be performed for data having a size of multiples of 96 KB, such as 96 KB, 192 KB and 288 KB. That is, a reference size of data as a target of the one-shot program operation may be the multiples of 96 KB. One physical page of the TLC memory block includes three logical pages. The data may be sequentially programmed into a first logical page MSB, a second logical page CSB and a third logical page LSB included in one physical page of the TLC memory block. However, this is merely one embodiment, and the present embodiment is not limited thereto.

The host 102 may provide a write command to the memory system 110 in order to store user data having 64 KB.

The write command and the user data may be inputted to the controller 130 through the host interface unit 132, and the user data may be temporarily stored in the memory 144 under the control of the processor 134.

Subsequently, the processor 134 may select a TLC memory block in which the user data is to be stored based on the write command. Further, the processor 134 may compare the size of the user data with the reference size of the one-shot program operation. Since the size of the user data is 64 KB and the reference size of the one-shot program operation is 96 KB, that is, the size of the user data is different from the reference size of the one-shot program operation by an amount of 32 KB, the user data may be programmed into the memory block together with dummy data having 32 KB. Accordingly, the processor 134 may control the memory device 150 to program the 64 KB user data (refer to shaded portions shown in the drawing) together with the 32 KB dummy data (refer to hatched portions shown in the drawing) into an $n^{th}$ physical page Pn of at least one TLC dummy open memory block 550 among the plurality of dummy memory blocks 156.

In the present embodiment, the processor 134 may generate the 32 KB dummy data, and provide the 64 KB user data and the 32 KB dummy data to the memory device 150 through the memory interface unit 142. Subsequently, the processor 134 may control the memory device 150 to program the 64 KB user data and the 32 KB dummy data into the $n^{th}$ physical page Pn. In some embodiments, the processor 134 may provide the 64 KB user data to the memory device 150 through the memory interface unit 142, and control the memory device 150 to generate the 32 KB dummy data. Subsequently, the processor 134 may control the memory device 150 to program the 32 KB dummy data and the 64 KB user data into the $n^{th}$ physical page Pn.

Figure 6A:
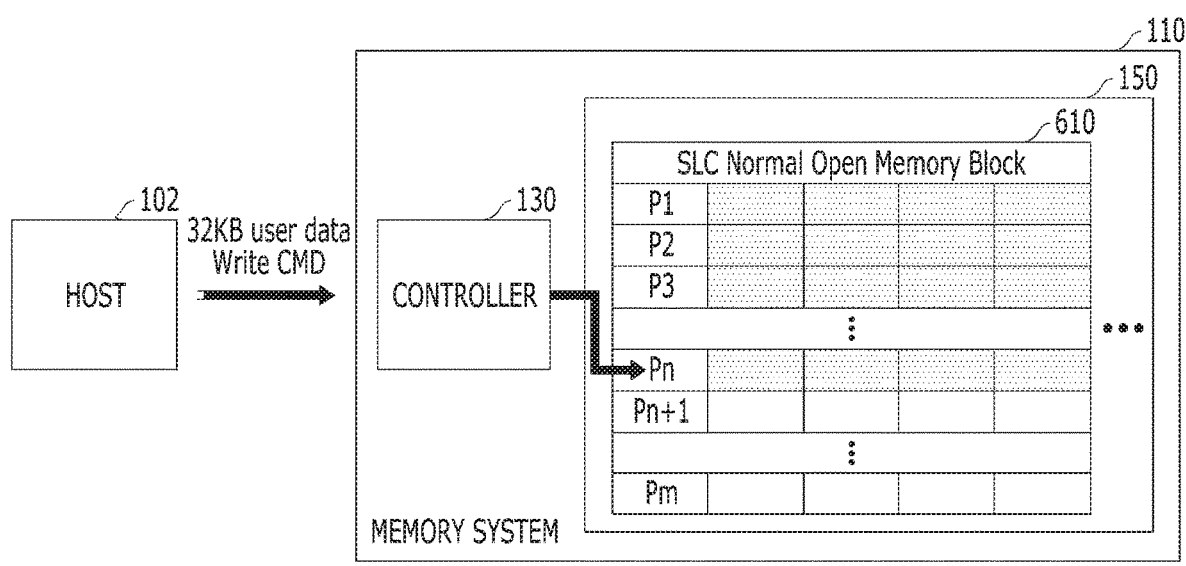
FIG. 6A is a block diagram schematically illustrating an operation of the memory system to program data into an SLC normal open block in accordance with an embodiment of the present disclosure.

FIG. 6A is a block diagram schematically illustrating an operation of the memory system 110 to program data into an SLC normal open block in accordance with an embodiment.

In FIG. 6A, the memory block is a SLC memory block, and the one-shot program operation may be performed on a basis of one physical page of the SLC memory block. When the size of one physical page is 32 KB, the one-shot program operation may be performed for data having a size of multiples of 32 KB, such as 32 KB, 64 KB and 96 KB. That is, a reference size of data as a target of the one-shot program operation may be the multiples of 32 KB.

The host 102 may provide a write command to the memory system 110 in order to store user data having 32 KB.

The write command and the user data may be inputted to the controller 130 through the host interface unit 132, and the user data may be temporarily stored in the memory 144 under the control of the processor 134.

Subsequently, the processor 134 may select a SLC memory block in which the user data is to be stored based on the write command. Further, the processor 134 may compare the size of the user data with the reference size of the one-shot program operation. Since the size of the user data is 32 KB and the reference size of the one-shot program operation is 32 KB, that is, the size of the user data is equal to the reference size of the one-shot program operation, only the user data may be programmed into the memory block. Accordingly, the processor 134 may control the memory device 150 to program the 32 KB user data (refer to shaded portions shown in the drawing) into an $n^{th}$ physical page Pn of at least one SLC normal open memory block 610 among the plurality of normal memory blocks 152.

Figure 6B:
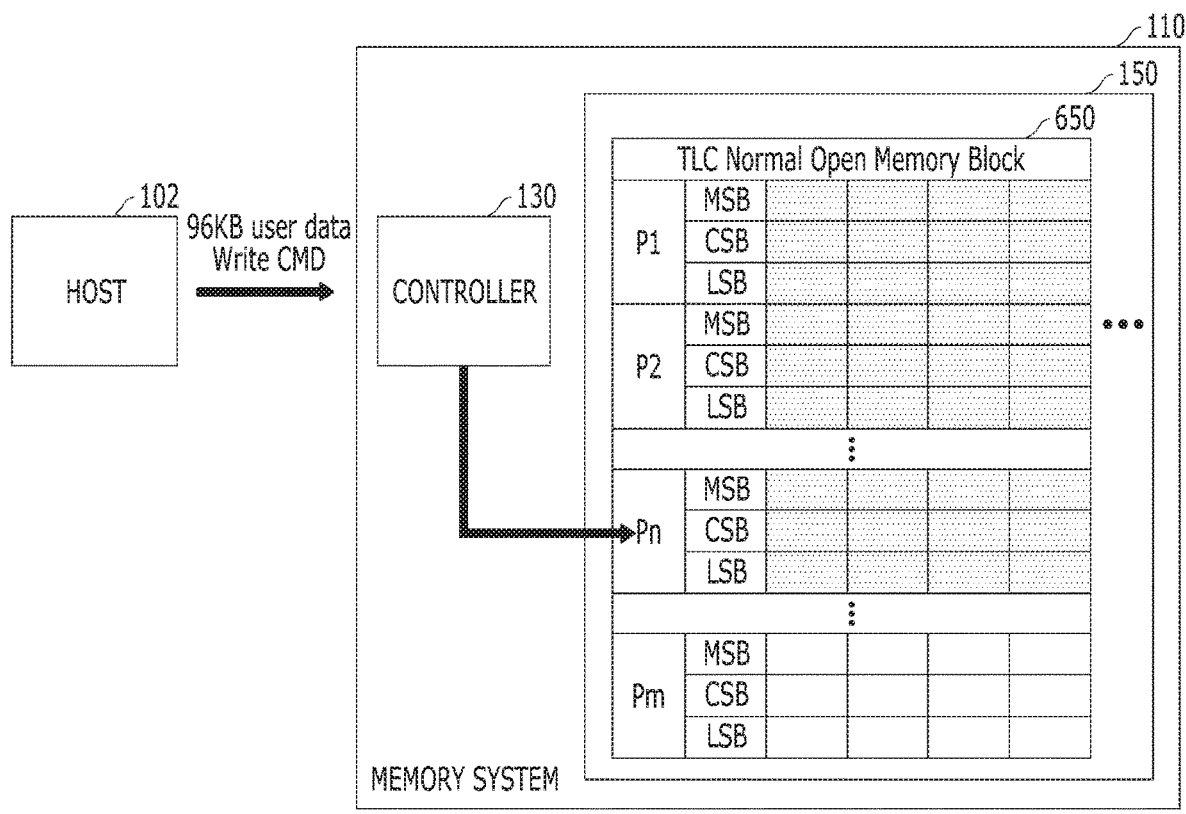
FIG. 6B is a block diagram schematically illustrating an operation of the memory system to program data into a TLC normal open block in accordance with an embodiment of the present disclosure.

FIG. 6B is a block diagram schematically illustrating an operation of the memory system 110 to program data into a TLC normal open block in accordance with an embodiment.

In FIG. 6B, a memory block is a TLC memory block, and the one-shot program operation may be performed on a basis of one physical page of the TLC memory block. When the size of one page is 96 KB, the one-shot program operation may be performed for data having a size of multiples of 96 KB, such as 96 KB, 192 KB and 288 KB. That is, a reference size of data as a target of the one-shot program operation may be the multiples of 96 KB. One physical page of the TLC memory block includes three logical pages. The data may be sequentially programmed into a first logical page MSB, a second logical page CSB and a third logical page LSB included in one physical page of the triple level cell memory block. However, this is merely one embodiment, and the present embodiment is not limited thereto.

The host 102 may provide a write command to the memory system 110 in order to store user data having 96 KB.

The write command and the user data may be inputted to the controller 130 through the host interface unit 132, and the user data may be temporarily stored in the memory 144 under the control of the processor 134.

Subsequently, the processor 134 may select a TLC memory block as a type of a memory block in which the user data is to be stored based on the write command. Further, the processor 134 may compare the size of the user data with the reference size of the one-shot program operation. Since the size of the user data is 96 KB and the reference size of the one-shot program operation is 96 KB, that is, the size of the user data is equal to the reference size of the one-shot program operation, only the user data may be programmed into the memory block. Accordingly, the processor 134 may control the memory device 150 to program the 96 KB user data (refer to shaded portions shown in the drawing) into an $n^{th}$ physical page Pn of at least one TLC normal open memory block 650 among the plurality of normal memory blocks 152.

Figure 7:
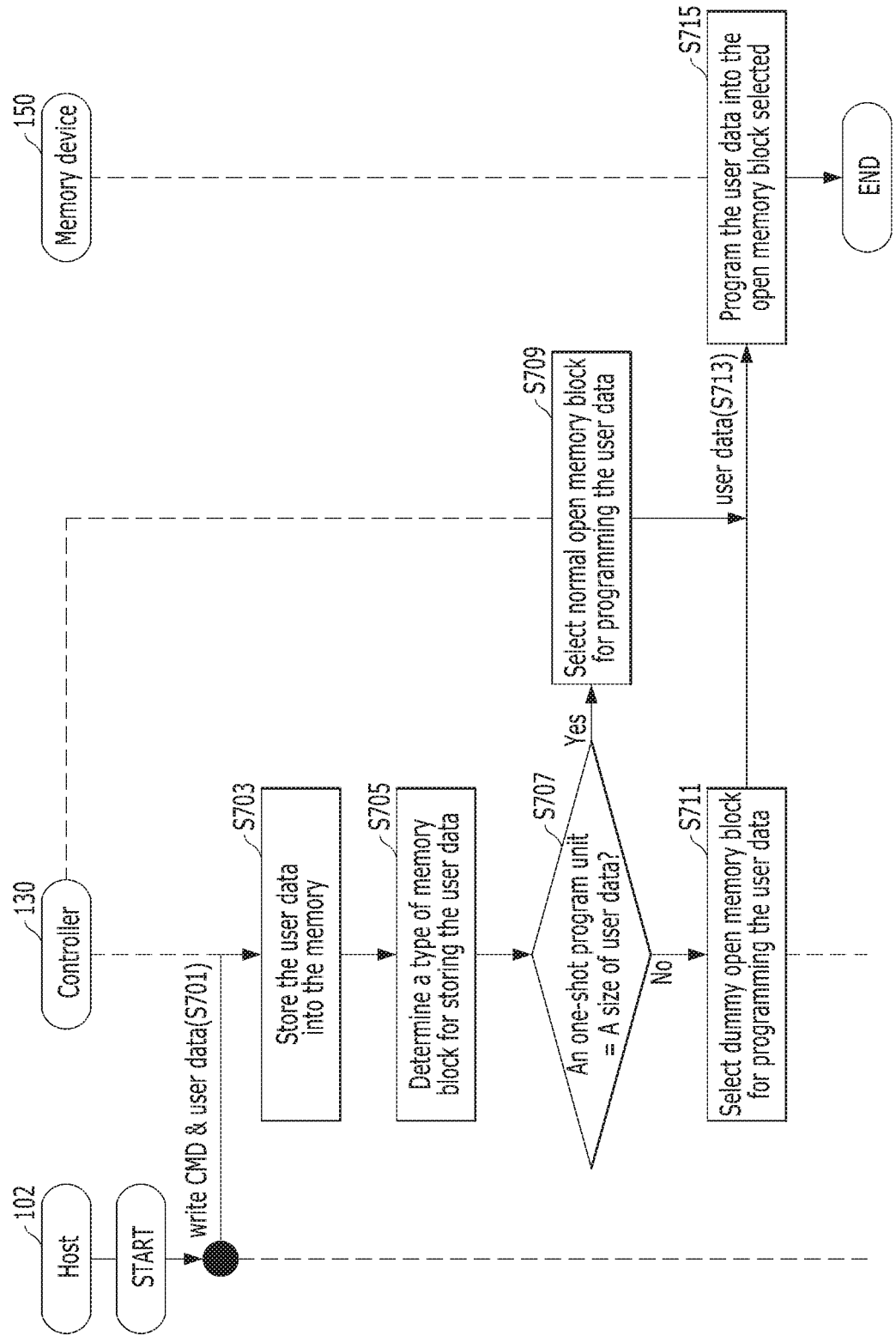
FIG. 7 is a flowchart illustrating an operation of the memory system in accordance with an embodiment of the present disclosure.

FIG. 7 is a flowchart illustrating an operation of the memory system 110 in accordance with an embodiment.

In step S701, the host 102 may provide a write command and user data to the controller 130 through the host interface unit 132.

In step S703, the memory 144 may temporarily store the user data under the control of the processor 134. For example, the memory 144 may temporarily store the user data in the data buffer.

In step S705, the processor 134 may determine a type of a memory block (e.g., the SLC memory block or the TLC memory block) for storing the user data in response to the write command provided from the host 102.

In step S707, the processor 134 may compare a reference size of the one-shot program operation corresponding to the determined type of the memory block, with a size of the user data.

When the reference size of the one-shot program operation is equal to the size of the user data (that is, "YES" in step S707), the processor 134 may select one or more normal open memory blocks among a plurality of normal memory blocks 152 to program the user data, in step S709.

On the other hand, when the reference size of the one-shot program operation is different from the size of the user data (that is, "NO" in step S707), the processor 134 may select one or more dummy open memory blocks among a plurality of dummy memory blocks 156 to program the user data, in step S711.

Subsequently, the processor 134 may provide the user data to the memory device 150 through the memory interface unit 142 in step S713. Although not illustrated, the processor 134 in accordance with the present embodiment may provide dummy data together with the user data to the memory device 150 through the memory interface unit 142.

In step S715, the memory device 150 may program the user data into the open memory block selected under the control of the processor 134.

Figure 8:
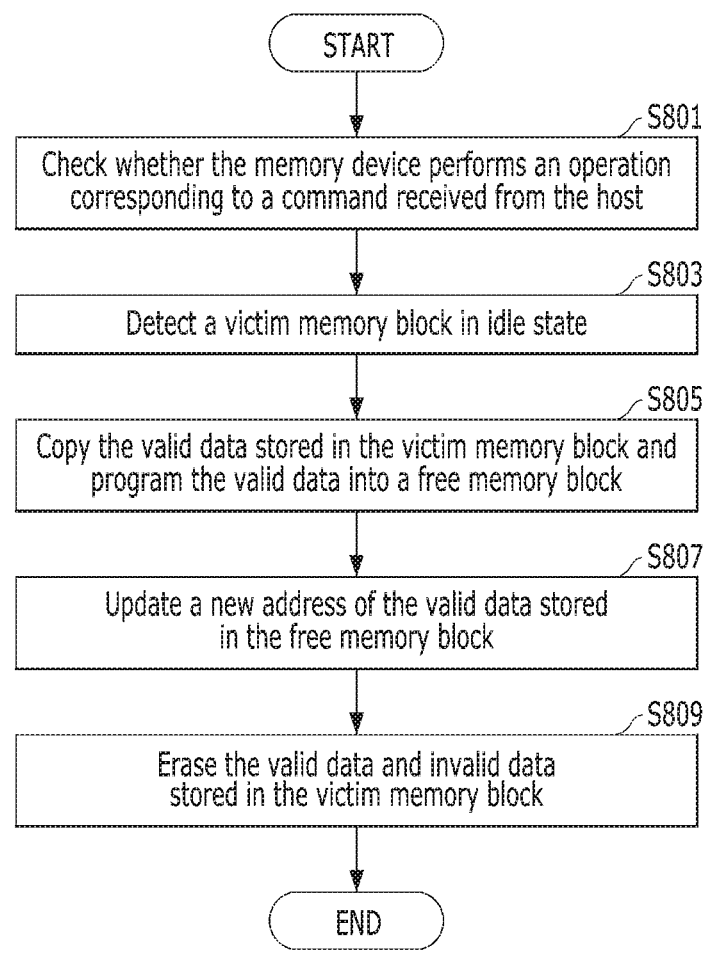
FIG. 8 is a flowchart illustrating an operation of the memory system in accordance with an embodiment of the present disclosure.

FIG. 8 is a flowchart illustrating an operation of the memory system 110 in accordance with an embodiment. The memory system 110 may need to secure a plurality of free memory blocks in the memory device 150 in order to secure sufficient data storage space. The memory system 110 may perform a garbage collection operation to secure the free memory blocks.

In step S801, the memory system 110 may check whether the memory device 150 performs an operation corresponding to a command received from the host 102. In other words, the memory system 110 may check whether the memory device 150 currently performs an operation corresponding to a host command. For example, the memory system 110 may check whether the memory device 150 currently performs a program, read, or erase operation corresponding to the command provided from the host 102. When the memory device 150 currently performs the program, read, or erase operation, the memory system 110 may not perform the garbage collection operation. In other words, the memory system 110 may perform the garbage collection operation only when the memory device 150 is in an idle state.

In step S803, the memory system 110 may detect a victim memory block in the idle state. In this case, the memory system 110 may detect a memory block having a smaller number of valid pages than a predetermined threshold value as the victim memory block among a plurality of memory blocks. In addition, the memory system 110 may detect a plurality of dummy memory blocks 156 as the victim memory blocks in preference to a plurality of normal memory blocks 152. The operation performed in step S803 is described below in further detail with reference to FIG. 9.

In step S805, the memory system 110 may copy valid data stored in the detected victim memory block, temporarily store the valid data in the memory 144, and program the temporarily stored valid data into a free memory block. In other words, the memory system 110 may move the valid data stored in the victim memory block to the free memory block.

In step S807, the memory system 110 may update address information on the valid data stored in the free memory block.

In step S809, the memory system 110 may perform the erase operation for erasing all of the valid data and invalid data stored in the victim memory block. The memory system 110 may secure the free memory block through the erase operation.

Figure 9:
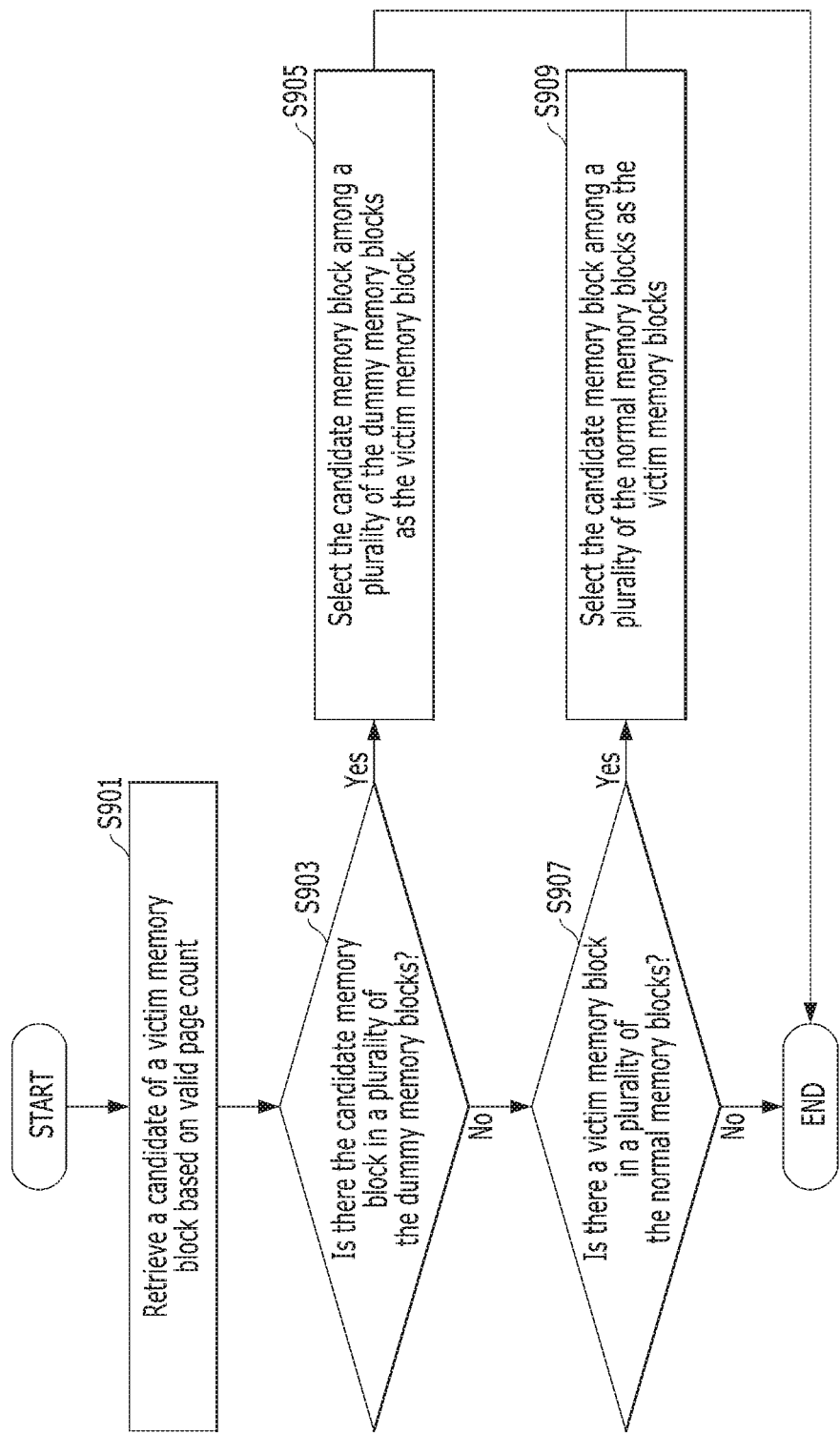
FIG. 9 is a flowchart illustrating an operation in which a memory system retrieves a victim memory block in accordance with an embodiment of the present disclosure.

FIG. 9 is a flowchart illustrating an operation in which the memory system 110 retrieves a victim memory block in accordance with an embodiment. FIG. 9 illustrates a detailed operation of step S803 shown in FIG. 8.

In step S901, the memory system 110 retrieves a candidate of a victim memory block based on the number of valid pages of a plurality of memory blocks 152 and 156. Specifically, the memory 144 may store information on the number of valid pages corresponding to each of the memory blocks under the control of the processor 134. The memory system 110 may retrieve a memory block having a smaller number of valid pages than a predetermined threshold value as a candidate of the victim memory block, based on the number of valid pages stored in the memory 144.

In step S903, the memory system 110 may check whether there is a candidate memory block in a plurality of dummy memory blocks 156.

Where there is the candidate memory block among the plurality of dummy memory blocks 156 (that is, "YES" in step S903), the memory system 110 may select at least one candidate memory block among the plurality of dummy memory blocks 156 as the victim memory block in step S905.

On the other hand, where there is no candidate memory block among the plurality of dummy memory blocks 156 (that is, "NO" in step S903), the memory system 110 may check whether there is a candidate memory block among a plurality of normal memory blocks 152 in step S907.

When there is the candidate memory block among the plurality of normal memory blocks 152 (that is, "YES" in step S907), the memory system 110 may select at least one candidate memory block among the plurality of normal memory blocks 152 as the victim memory block in step S909.

The memory system 110 may perform the operations, which correspond to steps S805 to S809 shown in FIG. 8, on the selected victim memory block.

As described above, when data is composed of user data only or a combination of user data and dummy data based on a reference size of the one-shot program operation, the memory system 110 may efficiently process the dummy data by changing the programming method. Consequently, the performance of the memory system 110 may be improved.

Hereinafter, a data processing system and electronic devices which may be implemented with the memory system 110 including the memory device 150 and the controller 130, which have been described with reference to FIGS. 1 to 9, will be described in detail with reference to FIGS. 10 to 18.

FIGS. 10 to 18 are diagrams schematically illustrating application examples of the data processing system of FIGS. 1 to 9 according to various embodiments.

Figure 10:
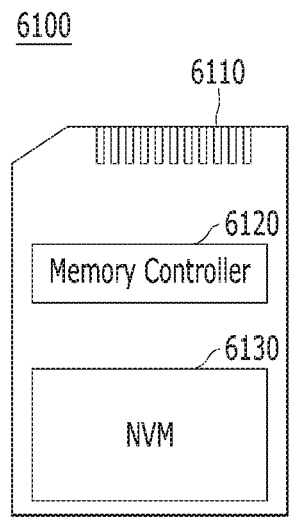
FIGS. 10 to 18 are diagrams schematically illustrating application examples of a data processing system, in accordance with various embodiments of the present invention.

FIG. 10 is a diagram schematically illustrating an example of the data processing system including the memory system in accordance with an embodiment. FIG. 10 schematically illustrates a memory card system 6100 including the memory system in accordance with an embodiment.

Referring to FIG. 10, the memory card system 6100 may include a memory controller 6120, a memory device 6130 and a connector 6110.

More specifically, the memory controller 6120 may be connected to the memory device 6130, and may be configured to access the memory device 6130. The memory device 6130 may be embodied by a nonvolatile memory (NVM). By way of example but not limitation, the memory controller 6120 may be configured to control read, write, erase, and background operations onto the memory device 6130. The memory controller 6120 may be configured to provide an interface between the memory device 6130 and a host (not shown) and/or a drive firmware for controlling the memory device 6130. That is, the memory controller 6120 may correspond to the controller 130 in the memory system 110 described with reference to FIGS. 1 to 9, while the memory device 6130 may correspond to the memory device 150 described with reference to FIGS. 1 to 9.

Thus, as shown in FIG. 1, the memory controller 6120 may include a random access memory (RAM), a processor, a host interface, a memory interface and an error correction code component. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), a secured digital (SD) card (e.g., SD, miniSD, microSD and SDHC) and a universal flash storage (UFS).

Figure 11:
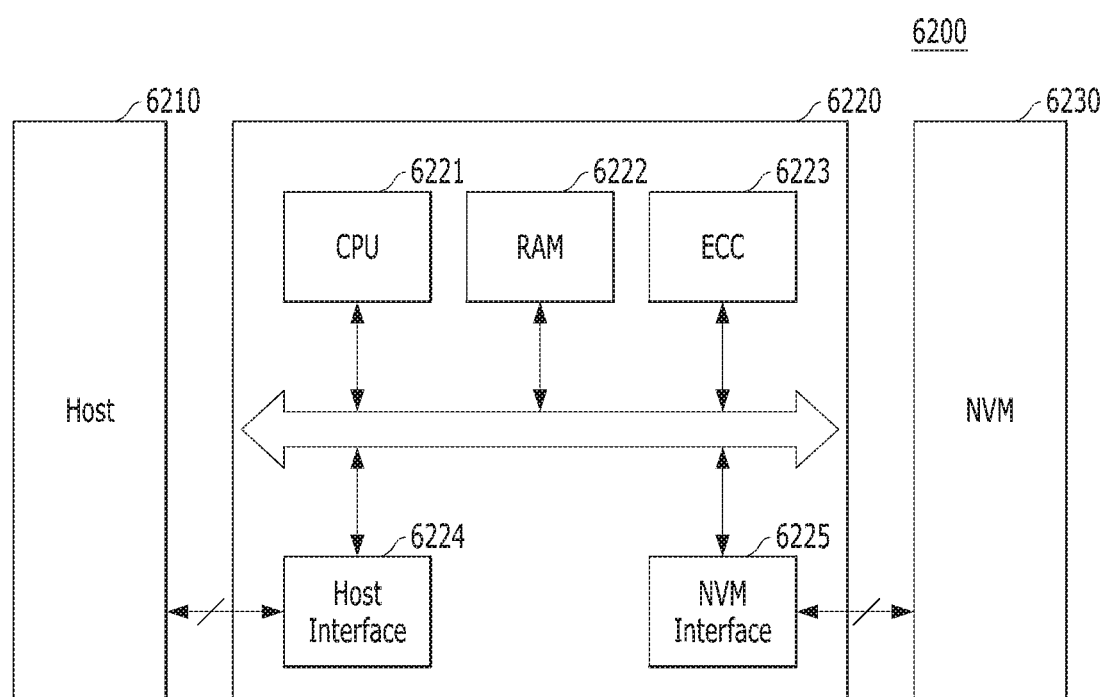

FIG. 11 is a diagram schematically illustrating another example of a data processing system 6200 including a memory system, accordance with an embodiment.

Referring to FIG. 11, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 9, and the memory controller 6220 may correspond to the controller 130 in the memory system 110 described in FIGS. 1 to 9.

The memory controller 6220 may control a read, write, or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory, or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. In this case, the ECC circuit 6223 may correct an error using the parity bit. For example, as described with reference to FIG. 1, the ECC circuit 6223 may correct an error using Low Density Parity Check (LDDC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may transmit to, and/or receive from, the host 6210 data or signals through the host interface 6224, and may transmit to, and/or receive from, the memory device 6230 data or signals through the NVM interface 6225. The host interface 6224 may be connected to the host 6210 through a parallel advanced technology attachment (PATA) bus, a serial advanced technology attachment (SATA) bus, a small computer system interface (SCSI), an universal serial bus (USB), a peripheral component interconnect-express (PCIe), or a NAND interface. The memory controller 6220 may have a wireless communication function with a mobile communication protocol such as wireless fidelity (WiFi) or Long Term Evolution (LTE).

The memory controller 6220 may be connected to an external device, e.g., the host 6210, or another external device, and then transmit and/or receive data to and/or from the external device. As the memory controller 6220 is configured to communicate with the external device through one or more of various communication protocols, the memory system and the data processing system in accordance with an embodiment may be applied to wired and/or wireless electronic devices, particularly a mobile electronic device.

Figure 12:
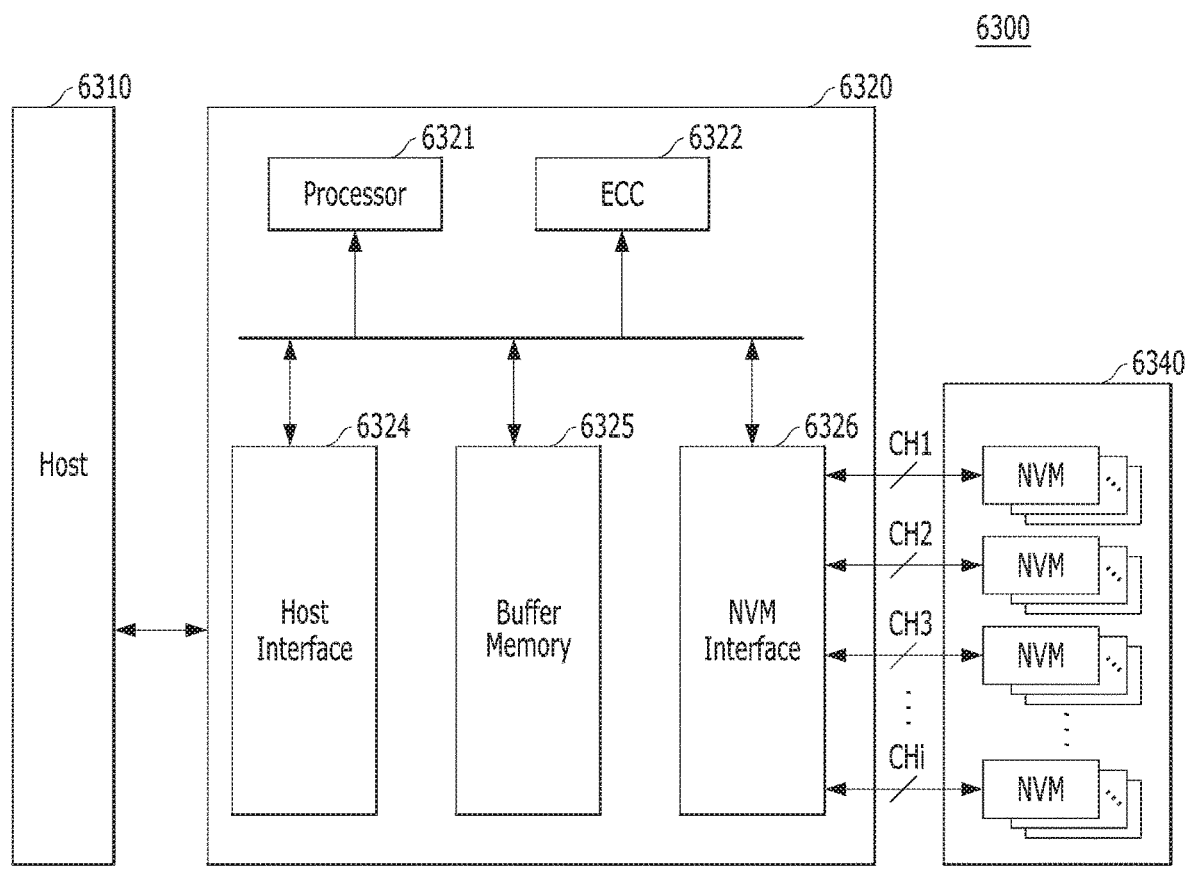

FIG. 12 is a diagram schematically illustrating another example of the data processing system including the memory system in accordance with an embodiment. FIG. 12 schematically illustrates a solid state drive (SSD) to which the memory system in accordance with an embodiment is applied.

Referring to FIG. 12, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a dynamic random access memory (DRAM), a synchronous DRAM (SDRAM), a double data rate (DDR) SDRAM, a low power DDR (LPDDR) SDRAM and a graphics RAM (GRAM) or non-volatile memories such as a ferroelectric RAM (FRAM), a resistive RAM (RRAM or ReRAM), a spin-transfer torque magnetic RAM (STT-MRAM) and a phase-change RAM (PRAM). For the purpose of description, FIG. 12 illustrates that the buffer memory 6325 exists in the controller 6320, but the buffer memory 6325 may be located or arranged outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
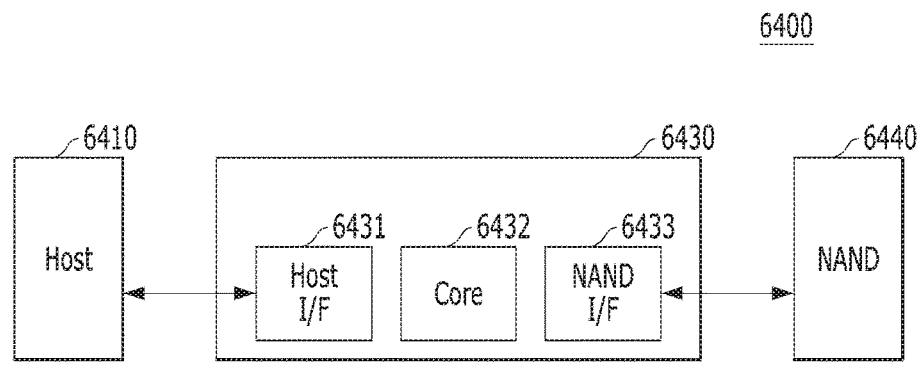

FIG. 13 is a diagram schematically illustrating another example of the data processing system including the memory system in accordance with an embodiment. FIG. 13 schematically illustrates an embedded Multi-Media Card (eMMC) 6400 to which the memory system in accordance with an embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control the operations of the eMMC 6400, the host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

FIGS. 14 to 17 are diagrams schematically illustrating other examples of the data processing system including the memory system in accordance with an embodiment. FIGS. 14 to 17 schematically illustrate universal flash storage (UFS) systems to which the memory system in accordance with an embodiment is applied.

Referring to FIGS. 14 to 17, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired and/or wireless electronic devices, particularly mobile electronic devices, the UFS devices 6520, 6620, 6720, 6820 may serve as embedded UFS devices. The UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired and/or wireless electronic devices, particularly mobile electronic devices through UFS protocols. The UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 11 to 13, and the UFS cards 6530, 6630, 6730, 6830 may be embodied in the form of the memory card system 6100 described with reference to FIG. 10.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., universal storage bus (USB) Flash Drives (UFDs), multi-media card (MMC), secure digital (SD), mini-SD, and micro-SD.

Figure 14:
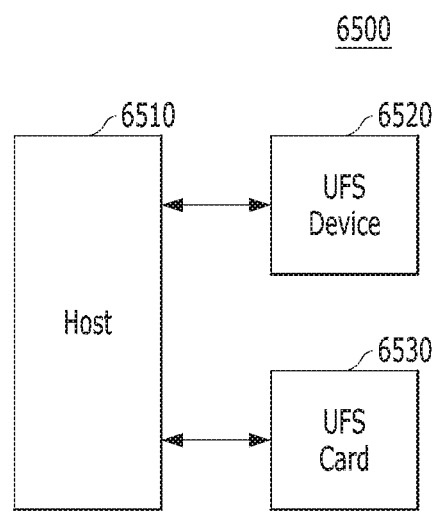

In the UFS system 6500 illustrated in FIG. 14, each of the host 6510, the UFS device 6520 and the UFS card 6530 may include UniPro.

The host 6510 may perform a switching operation to communicate with at least one of the UFS device 6520 and the UFS card 6530. The host 6510 may communicate with the UFS device 6520 or the UFS card 6530 through link layer switching, e.g., L3 switching at the UniPro. In this case, the UFS device 6520 and the UFS card 6530 may communicate with each other through a link layer switching at the UniPro of the host 6510. In an example, the configuration in which one UFS device 6520 and one UFS card 6530 are connected to the host 6510 has been exemplified for convenience of description. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520. Herein, the form of a star means an arrangement that a single device is coupled with plural other devices or cards for centralized control.

Figure 15:
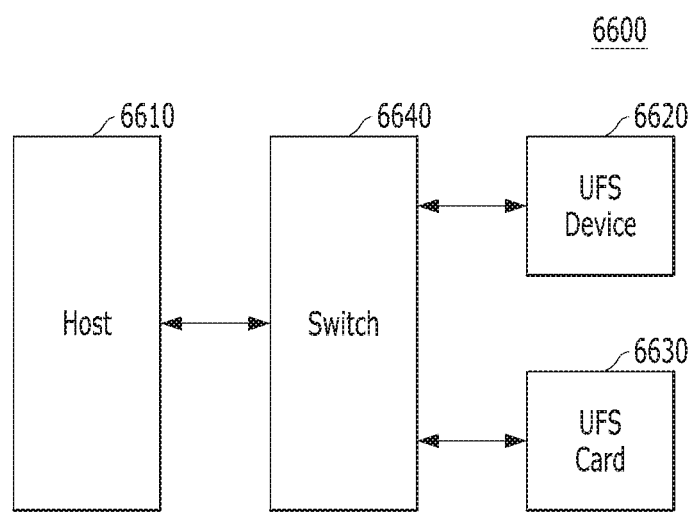

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an example, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
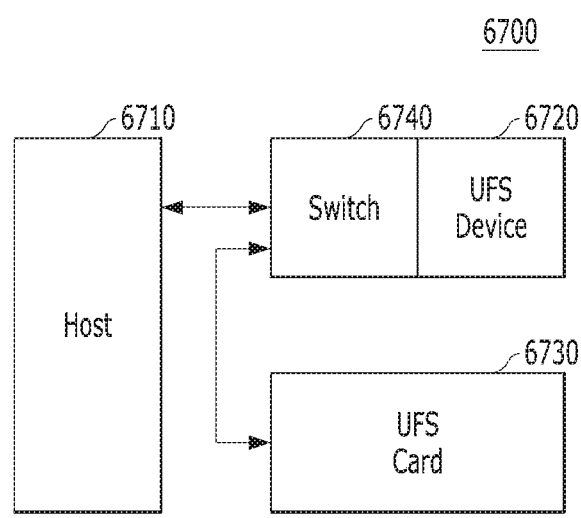

In the UFS system 6700 illustrated in FIG. 16, each of the host 6710, the UFS device 6720 and the UFS card 6730 may include UniPro. The host 6710 may communicate with the UFS device 6720 or the UFS card 6730 through a switching module 6740 performing a switching operation, for example, the switching module 6740 which performs link layer switching at the UniPro, for example, L3 switching. In this case, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an example, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
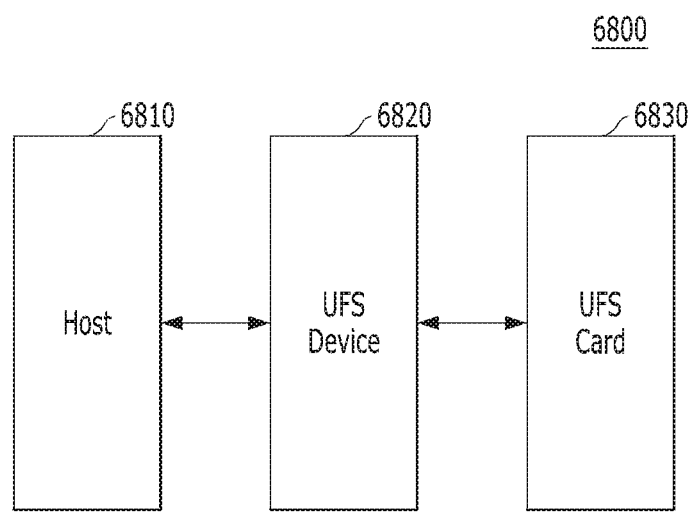

In the UFS system 6800 illustrated in FIG. 17, each of the host 6810, the UFS device 6820 and the UFS card 6830 may include M-PHY and UniPro. The UFS device 6820 may perform a switching operation to communicate with the host 6810 and the UFS card 6830. The UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. Here, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
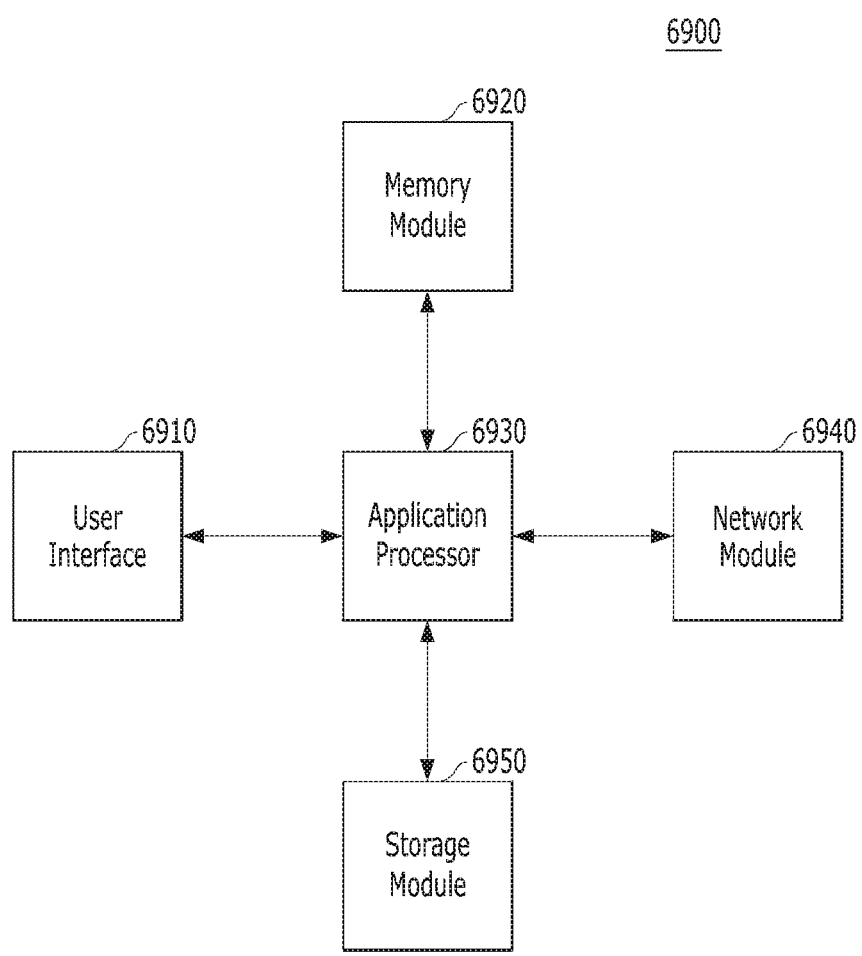

FIG. 18 is a diagram schematically illustrating another example of the data processing system including the memory system in accordance with an embodiment. FIG. 18 is a diagram schematically illustrating a user system 6900 to which the memory system in accordance with an embodiment is applied.

Referring to FIG. 18, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired and/or wireless communication with an external device. The user interface 6910 may display data processed by the processor 6930 on a display and touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as determined in the following claims.

What is claimed is:

1. A memory system comprising:
a memory device including a plurality of normal memory blocks and a plurality of dummy memory blocks; and
a controller suitable for controlling the memory device,
wherein the controller includes:
a memory suitable for storing user data corresponding to a write command; and
a processor suitable for performing a one-shot program operation of programming the user data into an open memory block in the memory device by comparing a size of the user data with a reference size for the one-shot program operation,
wherein the processor programs the user data into a dummy open memory block among the plurality of dummy memory blocks when the size of the user data is different from the reference size.

2. The memory system of claim 1, wherein the processor programs the user data into a normal open memory block among the plurality of normal memory blocks when the size of the user data is equal to the reference size.

3. The memory system of claim 1, wherein the processor selects a type of a target open memory block to which the user data is to be programmed, and subsequently compares the reference size corresponding to the type of the memory block with the size of the user data.

4. The memory system of claim 3, wherein, when the target open memory block is a single level cell memory block, the processor determines a size of a physical page as the reference size and compares the size of the physical page with the size of the user data.

5. The memory system of claim 3, wherein, when the target open memory block is a multiple level cell memory block, the processor determines a total size of a plurality of logical pages corresponding to one physical page as the reference size, and compares the total size of the logical pages with the size of the user data.

6. The memory system of claim 1,
wherein the memory stores the number of valid pages included in each of the normal memory bocks and the dummy memory blocks under the control of the processor,
wherein the processor retrieves a victim block based on the number of valid pages, copies valid data stored in the victim block, and programs the valid data into the open memory block.

7. The memory system of claim 6, wherein the processor retrieves the victim block when the memory device is in an idle state.

8. The memory system of claim 6, wherein the processor retrieves the victim block from the plurality of dummy memory blocks.

9. The memory system of claim 8, wherein the processor retrieves the victim block from the plurality of normal memory blocks when the victim block is not retrieved from the plurality of dummy memory blocks.

10. An operating method for a memory system including a plurality of normal memory blocks and a plurality of dummy memory blocks, the operating method comprising:
storing user data corresponding to a write command;
comparing a size of the user data with a reference size for a one-shot program operation; and performing the one-shot program operation of programming the user data into an open memory block based on the comparison result, wherein the user data is programmed into a dummy open memory block among the plurality of dummy memory blocks when the size of the user data is different from the reference size.

11. The operating method of claim 10, wherein the user data is programmed into a normal open memory block among the plurality of normal memory blocks when the size of the user data is equal to the reference size.

12. The operating method of claim 10, further comprising selecting a type of a target open memory block to which the user data is to be programmed, wherein the size of the user data is compared with the reference size corresponding to the type of the memory block.

13. The operating method of claim 12, wherein, when the target open memory block is a single level cell memory block, the reference size is a size of a physical page.

14. The operating method of claim 12, wherein, when the target open memory block is a multiple level cell memory block, the reference size is a total size of a plurality of logical pages corresponding to one physical page.

15. The operating method of claim 10, further comprising:

storing the number of valid pages included in each of the normal memory bocks and the dummy memory blocks;

retrieving a victim block based on the number of valid pages;

copying valid data stored in the victim block; and programming the valid data into the open memory block.

16. The operating method of claim 15, wherein the victim block is retrieved when a memory device is in an idle state.

17. The operating method of claim 15, wherein the victim block is retrieved from the plurality of dummy memory blocks.

18. The operating method of claim 17, wherein the victim block is retrieved from the plurality of normal memory blocks when the victim block is not retrieved from the plurality of dummy memory blocks.

* * * * *